United States Patent
Le chevalier (10) Patent No.: US 11,301,938 B1
(45) Date of Patent: *Apr. 12, 2022

(54) AUGMENTED REALITY ACCOUNT STATEMENT

(71) Applicant: Wells Fargo Bank, N.A., San Francisco, CA (US)

(72) Inventor: Vincent Le chevalier, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/931,385

(22) Filed: May 13, 2020

Related U.S. Application Data (63) Continuation of application No. 15/418,870, filed on Jan. 30, 2017, now Pat. No. 10,706,477.

(60) Provisional application No. 62/440,504, filed on Dec. 30, 2016.

(51) Int. Cl.
| | | |
|---|---|---|
| G06Q 40/00 | (2012.01) | |
| G06K 9/00 | (2006.01) | |
| H04L 29/06 | (2006.01) | |
| G06Q 40/02 | (2012.01) | |
| G06T 19/00 | (2011.01) | |
| G06Q 20/40 | (2012.01) | |
| G06F 7/02 | (2006.01) | |

(52) U.S. Cl.
CPC ......... *G06Q 40/12* (2013.12); *G06K 9/00087* (2013.01); *G06K 9/00449* (2013.01); *G06K 9/00671* (2013.01); *G06Q 40/02* (2013.01); *G06T 19/006* (2013.01); *H04L 63/0861* (2013.01); *G06F 7/02* (2013.01); *G06Q 20/40* (2013.01)

(58) Field of Classification Search
CPC ........ G06Q 40/12; G06Q 40/02; G06Q 20/40; G06K 9/00087; G06K 9/00449; G06K 9/00671; G06T 19/006; H04L 63/0861; G06F 7/02
USPC .......................................... 705/30
See application file for complete search history.

(56) References Cited

U.S. PATENT DOCUMENTS

| | | | |
|---|---|---|---|
| 7,379,901 B1 * | 5/2008 | Philyaw | G06Q 20/10 705/17 |
| 7,493,283 B1 * | 2/2009 | Philyaw | G06Q 20/10 705/39 |
| 2003/0158844 A1 | 8/2003 | Kramer et al. | |
| 2004/0093281 A1 | 5/2004 | Silverstein et al. | |
| 2008/0163379 A1 * | 7/2008 | Robinson | G06F 3/04815 726/27 |
| 2011/0099067 A1 | 4/2011 | Cooper et al. | |

(Continued)

OTHER PUBLICATIONS

Night Sky, copyright 2017, iCandi Apps Limited, 19 pgs.

*Primary Examiner* — Florian M Zeender
*Assistant Examiner* — Nicole Elena Bruner
(74) *Attorney, Agent, or Firm* — Merchant & Gould P.C.

(57) ABSTRACT

An augmented reality system enables consumers to access additional data and services when reviewing printed account statements. A built-in camera of a mobile device captures an image of the account statement. The captured image is processed to correlate the account statement to an account provider, effectively unlocking a set of customized services related to the account statement being reviewed. The mobile device displays customized services for the user to view and interact with.

20 Claims, 6 Drawing Sheets

(56) References Cited

U.S. PATENT DOCUMENTS

| | | |
|---|---|---|
| 2012/0230577 A1 | 9/2012 | Calman et al. |
| 2012/0276870 A1 | 11/2012 | Davis et al. |
| 2013/0178257 A1* | 7/2013 | Langseth .............. A63F 13/812 463/4 |
| 2013/0218721 A1* | 8/2013 | Borhan ................. G06Q 30/02 705/26.41 |
| 2013/0346302 A1* | 12/2013 | Purves ................ G06Q 20/108 705/40 |
| 2014/0020061 A1 | 1/2014 | Popp et al. |
| 2015/0026056 A1 | 1/2015 | Calman et al. |
| 2015/0142545 A1 | 5/2015 | Ceribelli et al. |
| 2015/0379488 A1* | 12/2015 | Ruff ...................... G06Q 40/02 705/36 R |

\* cited by examiner

AUGMENTED REALITY ACCOUNT STATEMENT

CROSS-REFERENCE TO RELATED APPLICATIONS

The present application claims priority from U.S. Provisional Patent Application No. 62/440,504, filed on Dec. 30, 2016, the disclosure of which is hereby incorporated by reference in its entirety.

INTRODUCTION

Customers regularly receive statements about the accounts they have with service providers. Typically, service providers, such as banks, credit cards, and utilities, deliver account statements monthly. These account statements are usually an aggregation of the account holder's transactions for a given period of time. Most institutions make the account statements available both online and in printed format.

Regardless of format, account statements are presented to the consumer as a static page listing past transaction. Each transaction is highlighted or listed according to a number of predefined properties, such as date, vendor name, reference number or amount, and others.

SUMMARY

Examples and embodiments described herein relate to systems and methods for providing customers with access to additional data and services when reviewing printed account statements. In one aspect, a device-implemented method for augmenting an account statement includes capturing an image of the account statement, processing the image to generate processed image data, correlating the processed image data with reference data to identify an institution corresponding to the account statement, acquiring enhanced data, the enhanced data related to the account statement, and displaying the enhanced data on a display of a mobile device. Generally, the enhanced data are overlaid on top of images/video being captured by the mobile device. Example enhanced data include active icons, brands, text, animation, and combinations thereof, that are dynamically overlaid in a listing that basically reflects an ordering of the processed image data extracted from the account statement.

In another aspect, an augmented reality system includes a processing unit and system memory. The system memory includes instructions that, when executed by the processing unit, cause the electronic computing device to create: an extraction module programmed to extract account statement data from an image of an account statement, a correlation module programmed to: correlate one or more aspects of the account statement data with pre-existing account statement template data to identify a service provider associated with the account statement, and identify at least one transaction on the account statement. The instructions also cause the electronic computing device to create: a communication module programmed to transmit the account statement data, the service provider, and the at least one transaction to a server, an authentication module programmed to prompt a user for authentication data, transmit the authentication data to the server, and receive authentication confirmation from the server, and a visualization module programmed to acquire and display a plurality of visualizations on a display, the plurality of visualizations including static visualizations and dynamic visualizations.

The details of one or more embodiments are set forth in the accompanying drawings and the description below. Other features, objects, and advantages of these embodiments will be apparent from the description, drawings, and claims.

DESCRIPTION OF THE DRAWINGS

The following drawing figures, which form a part of this application, are illustrative of described technology and are not meant to limit the scope of the disclosure in any manner.

DETAILED DESCRIPTION

Various embodiments of the present disclosure will be described in detail with reference to the drawings, wherein like reference numerals represent like parts and assemblies throughout the several views. Additionally, any examples set forth in this specification are not intended to be limiting and merely set forth some of many possible embodiments.

The examples described herein relate to augmented reality systems. Augmented reality systems contemplated by this disclosure enable consumers to obtain additional services when reviewing account statements by leveraging built-in cameras of their mobile devices. Typically, financial account statements are augmented by the systems disclosed herein.

Generally, a consumer points a built-in camera to a page of an account statement, thereby enabling a mobile application to correlate the statement to the consumer's account service provider. The mobile application can be configured to process printed and online account statements. Successful correlation of the account statement and consumer account effectively unlocks access to one or more customized services related to the specific page or section of the particular account statement being reviewed.

Thereby, the consumer obtains access to the customized services, which include additional statement-related information ("enhanced data") with minimal input from the consumer. Usually, these enhanced data are overlaid on a mobile device display. Example enhanced data include active icons, brand logos, text, animation, and the like, that can generally reflect the order of extracted information of the account statement.

The enhanced data are provided without requiring the consumer to type anything and/or without requiring the consumer to issue any input commands. That is, when a registered user simply focuses the device on the statement, the device running the mobile application allows the consumer to access the enhanced data. These operations can be configured to run continuously in the background to keep extracting data from whatever portion of the account statement is within the mobile device built-in camera view.

Figure 1:
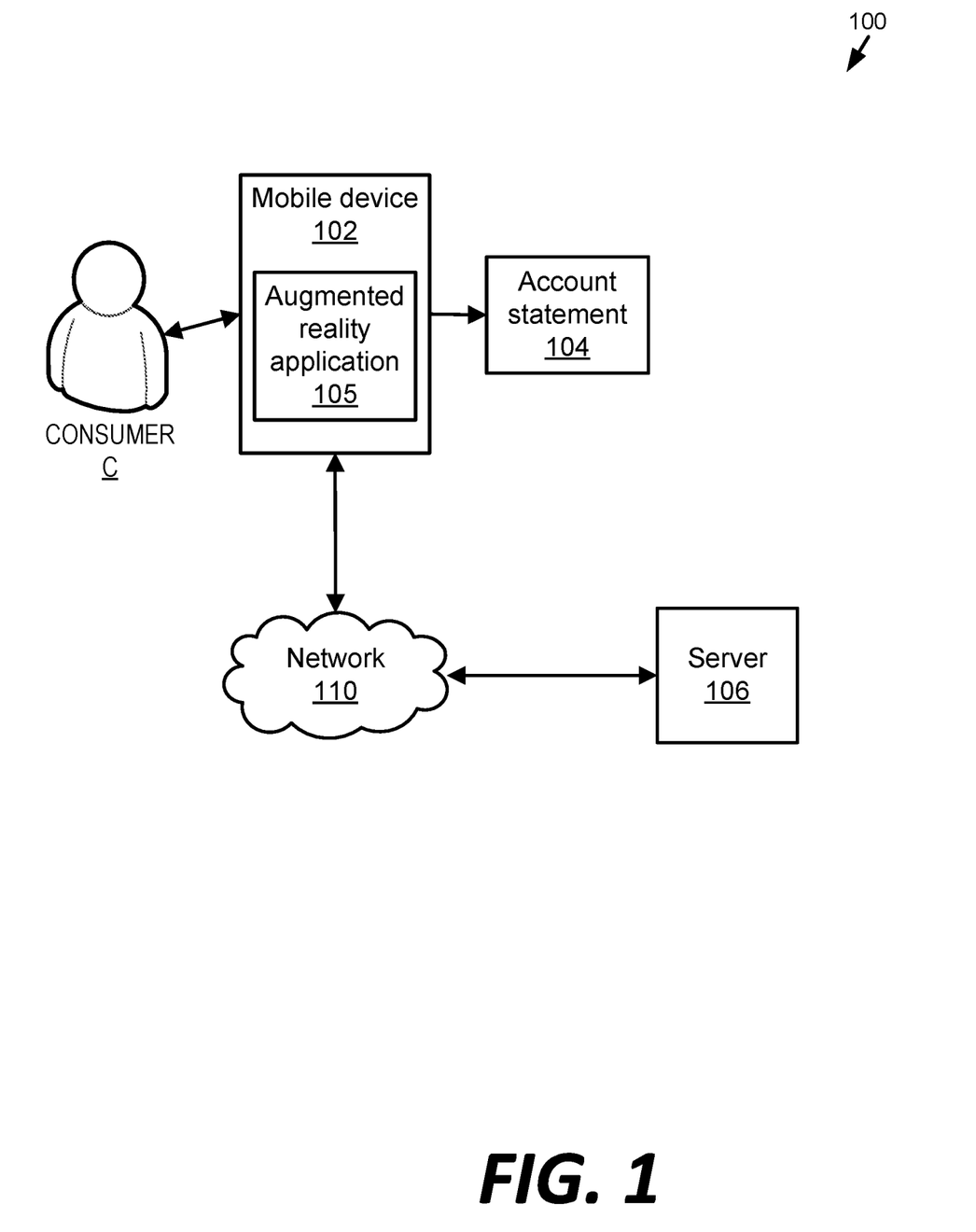
FIG. 1 shows an example augmented reality system environment.

FIG. 1 illustrates a schematic diagram of an example augmented reality system 100. The example augmented reality system 100 processes an account statement 104 and provides informative and/or interactive displays. The system 100 includes mobile device 102 hosting augmented reality application 105 and server 106 hosting augmented reality application 108, B2C portal 112 and B2B portal 114. Mobile device 102 and server 106 communicate via network 110. Consumer C has access to both mobile device 102 and account statement 104. Other embodiments can include more or fewer components.

Typically, consumer C is a person associated with an account at a financial institution that hosts server 106. Example financial institutions include banks, credit unions, credit card issuers, etc. Consumer C can have any one of many types of accounts with the financial institution, such as checking account, savings account, credit account, and so forth.

Account statement 104 includes details for a particular account with a service provider. Typically, consumer C is the account holder associated with the account detailed on the account statement 104. Account statement 104 is usually for a financial account, such as a savings account, credit card account, checking account, etc., however other types of accounts are within the scope of this disclosure.

Figure 4:
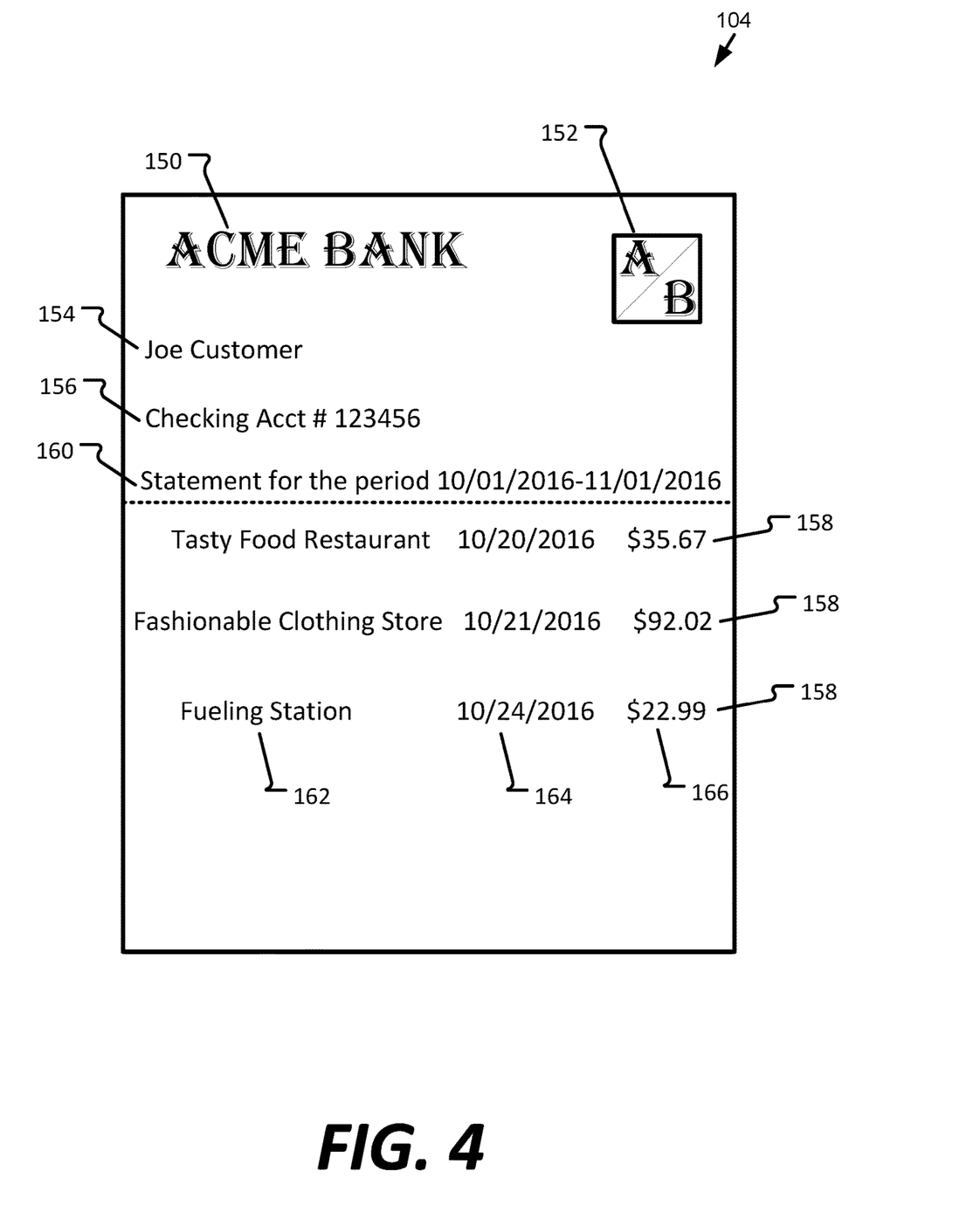
FIG. 4 shows an example account statement in the system of FIG. 1.

An example account statement 104 is shown in FIG. 4 for a checking account. The example account statement includes a service provider name 150 and a logo 152 associated with the service provider. The account statement 104 also provides the customer name 154 for the account and the account number 156. Transaction data 158 for transactions occurring within a time period 160 are also shown on account statement 104. Example transaction data 158 includes merchant name 162, date 164, and amount 166. Transaction data 158 can also include a unique transaction number.

Referring again to FIG. 1, consumer C uses mobile device 102 to enhance account statement 104. Examples of mobile device 102 include a tablet computing device, a smartphone, a wearable computing device (such as an augmented reality device), a mobile computing device, or other similar device. Mobile device 102 includes a built-in camera as well as some or all components of the example computing device shown in FIG. 6.

Mobile device 102 hosts augmented reality application 105. Augmented reality application 105 includes one or more modules that process account statement 104 and provide additional data on a display of mobile device 102. Example modules in augmented reality application 105 are shown and described in more detail with reference to FIG. 2, below.

Upon activating augmented reality application 105, consumer C directs the built-in camera of the mobile device 102 towards account statement 104. Processing account statement 104 is performed by augmented reality application 105 and/or server 106. Generally, augmented reality application 105 causes mobile device 102 to operate as video-pass through, where information displayed by mobile device 102 includes information received by the built-in camera of mobile device 102.

Server 106 includes one or more components to support augmented reality application 105. For example, server 106 can include modules to prepare and interface with account details, business-to-consumer (B2C) portals, and business-to-business (B2B) portals. Example components of server 106 are shown in more detail in FIG. 3, discussed below.

Mobile device 102 can communicate with server 106 through one or more networks 110. The network 110 can include any type of wireless network, wired network, or any communication network known in the art. For example, wireless connections can include cellular network connections and connections made using protocols such as 802.11a, b, and/or g. Further, network 110 can be a local area network (LAN), a wide area network (WAN), the Internet, or a combination thereof. Communications can be implemented using wired and/or wireless technologies.

Figure 2:
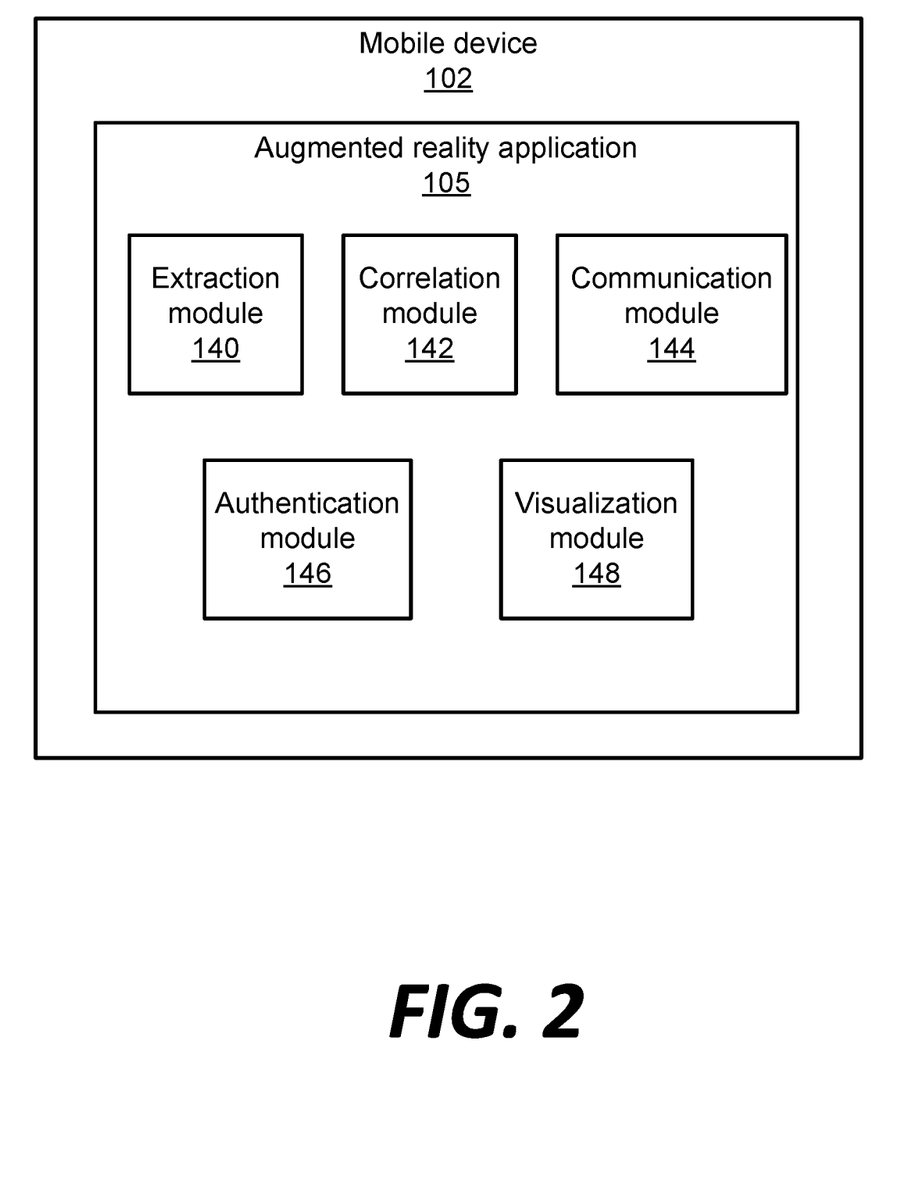
FIG. 2 shows example components of a mobile device in the system of FIG. 1.

FIG. 2 shows logical components of the augmented reality application 105. In this example, the augmented reality application 105 includes extraction module 140, correlation module 142, communication module 144, authentication module 146, and visualization module 148. Other embodiments can include more or fewer components.

Augmented reality application 105 is programmed to execute the modules 140, 142, 144, 146, and 148 according to firmware and/or software accessible to mobile device 102. For example, the processing unit of mobile device 102 executes software stored on computer readable media to implement the modules 140, 142, 144, 146, and 148.

Extraction module 140 is interfaced with one or more components controlling the mobile device 102 built-in camera, such as, for example, operating system drivers or software configured to control the mobile device 102 built-in camera. Extraction module 140 can be configured to cause the mobile device 102 built-in camera to operate in a video capture mode at a given frame rate.

In most instances, extraction module 140 operates as a background process that continually captures images or grabs frames of an incoming live video stream captured by the mobile device 102 built-in camera. The frame sampling/image obtaining rate can be predetermined. For instance, extraction module 140 can be configured to capture an image of the live video feed two times per second.

The sampling rate can be adjusted, for instance, depending upon results of correlation steps described below. For example, if a correlation result indicates incomplete data, the frame rate of the camera, and/or the rate at which frames are grabbed from the video stream, can be accelerated to capture more information. As another example, if a correlation result indicates no data, the frame rate of the camera, and/or the rate at which frames are grabbed from the video stream, can be slowed or stopped. These actions can be accompanied by providing a notice to the user operating the mobile device.

Upon capturing a frame or image, extraction module 140 processes the captured image to extract data that can be used by the correlation module 142. The extraction is an ongoing background process and generally imperceptible to the consumer operating mobile device 102. At a broad level, the extraction module 140 applies known data extraction mechanisms to the sampled incoming frames, where each frame is processed to extract a unique dataset. Frames are not stored like photographs—only the unique dataset is stored—because only the extracted data are of importance.

Example processes performed by extraction module 140 on the captured image include picture filtering algorithms, such as optical character recognition (OCR), which may or may not include picture alignment, aspect ratio normalization, page layout analysis, line and word detection, and character segmentation. The processed image data output from extraction module 140 includes one or more aspects of the account statement 104 that can be used to identify or correlate to a reference data set, such as a known statement template from a given service provider or archived statements for that registered user. Example processed image data output includes key words such as financial institution, customer name, date, transaction amount, transaction number, and/or vendor name(s). The resulting dataset, the processed image data, is transferred to correlation module 142.

Correlation module 142 receives the processed image data from extraction module 140 and matches those data to a particular service provider or stored/archived account statement. A given account statement can be matched to a particular service provider or to a stored account statement without capturing all information in the account statement, or even for a particular transaction. For example, a transaction number can be enough, by itself, to identify the account statement. Additionally, a combination of a transaction date and amount or a combination of a vendor and a transaction date may provide enough data from which the account statement can be identified.

A comparison of processed image data from consecutive frames can enable the correlation module 142 to build a more complete representation of the account statement being viewed, attributable at least in part to the fact that data are duplicated between consecutive frames. This duplication enables correlation module 142 to fill in incomplete keywords or incorrectly-identified characters from adjacently-captured frames.

In some instances, correlation module 142 constructs a template layout corresponding to the account statement 104. Typically, different service providers have different account templates. For instance, account templates can vary by description and location of account information, the number and location of columns, types of fonts used, location and size of graphic objects, and other aspects of a particular account statement that are unique to a particular service provider.

Correlation module 142 compares the processed image data, including the template layout data, to a set of pre-existing statement templates and the attributes associated with each template. If no correlation is found between the account statement 104 and a template in the set of pre-existing statement templates, then the properties of the account statement 104 are added to the set of pre-existing statement templates in order to be accessible in the future.

By correlating the layout of the processed image of the account statement 104 to an existing statement template, the correlation module 142 identifies the service provider that published that statement. A checking account statement from one financial institution is identified by a certain set of layout data that are different from another financial institution's savings account statement. Example differences include logo, font type, font size, text location, and/or margins.

When the processed image data are correlated to a particular service provider the correlation module 142 also correlates the processed image data with a list of transactions from the image. This correlation is performed based on typical transaction properties that are defined by the service providers based on key words and highlights of the transaction as extracted. An output of this correlation is a set of normalized transactions, even in the case of an extraction error, to the service provider template specifications. Once the financial institution origin of the statement is established, along with the account holder for that statement, the augmented reality application 105 can request and acquire access (from the platform back-end) to all the recorded archive datasets about that statement, which facilitates the correlation as it is applied to an already known, limited datasets.

Communication module 144 manages communications with server 106. Typically, communication module 144 is interfaced with the operating system software that controls access to data networks, such as network 110. Communication module 144 creates a bridge between mobile device 102 and server 106 that hosts augmented reality platform back end systems. The bridge is a secured communication link for all data exchange between mobile device 102 and server 106.

As an example, once a link between mobile device 102 and server 106 is secured, data exchanged between the augmented reality application 105 and the augmented reality platform back-end (server 106) includes basic information including device properties, such as type, manufacturer, IP address, device identification, and phone number if available. Data exchange between mobile device 102 and server 106 includes the account statement data requests, data delivery originating from and to the augmented reality application 105, and notifications provided to consumer C via mobile device 102.

Authentication module 146 manages user authentication. Authentication in augmented reality statements is different than traditional account access because authentication unlocks full access to the statement and related account. In some instances, authentication is not required to link a particular account statement transaction to some of the properties of that transaction, such as vendor website, location, or services. Preferably, augmented reality application 105 is configured to provide both a non-authenticated access mode and an authenticated access mode.

In non-authenticated access mode, consumer C uses mobile device 102 to capture an image of account statement 104. Based on the result of the correlation described above, augmented reality application 105 unlocks one or more services that correspond to the extracted correlated transactions as listed on that account statement. As an example, a correlated transaction with a specific retailer can unlock specific services from that retailer at the time when the consumer C is reviewing the statement.

In authenticated access mode, authentication module 146 prompts consumer C to enter identification data in order to unlock access to the services available from the institution holding the account shown in account statement 104. Typical identification data includes fingerprint, where the consumer C provides a fingerprint through a fingerprint scanner on mobile device 102 or the camera of mobile device 102. That received fingerprint is then compared with fingerprints associated with the account stored in a database. Identification data can also include user ID and password, voice recognition, face recognition, or any combination of the above.

Depending on implementation, service provider associated with the account statement 104 may represent a single institution or several. For example, a particular bank's augmented reality application 105 can be a single component of that bank's consumer online services. In contrast, an entity can aggregate multiple service providers with a single sign-on for all participating providers, thereby providing consumer C with a single application having centralized access to augmented account statements from participating providers.

Visualization module 148 renders the various visualizations and services on mobile device 102. Usually, the visualizations are overlaid on top of the live video being captured by the mobile device 102 built-in camera, in a pass through mode. The visualizations and services are active icons, brands, brand logos, text, animation, and combinations thereof. As the mobile device user moves the mobile device such that different sections of the account statement are viewable by the built-in camera, the mobile device display provides different overlaid information based on one or more correlated transactions.

These visualizations and services are based on the results of the correlation and login activities described above. Generally, the visualizations and services fall into the following categories: transaction-based services within a single service provider, reporting services within a single service provider, and transaction-based services within multiple service providers.

Transaction-based services within a single service provider typically relate to the transactions present in the account statement 104. Here, the overlaid information can be links to commercial offerings, downloadable discount codes, advertisements, promotional events, animations, and the like. In one instance, a particular service provides a hyperlink to the website corresponding to the correlated transaction. This can be done with or without authentication. For example, visualization module 148 provides a hyperlink to the website associated with the retailer of a transaction. As another example, visualization module 148 provides a hyperlink to a special offer, a discount coupon, an advertising, or a promotional event from the same retailer as in the transaction.

Transaction-based services can also include additional details about the correlated transaction. For example, a single transaction listed on the account statement is itemized into the individual items that were associated with that transaction. As an example, a single transaction at a retail location includes three purchased items. In that case, the visualization module 148 decomposes the transaction to list every item purchased during that transaction, as reported by that retailer's back-end systems to the server 106. Usually, this level of detail requires authentication.

The itemized listing from the transaction can be overlaid on top of the live statement view on the mobile device display. The itemized listing can include text, graphics, and/or animations. When the user moves the display or selects another transaction, the overlaid information is removed. Additionally, the user can select or click the listing for actionable commands, such as flag for review, download listing, etc.

Yet another example is when a service provider proposes that the consumer C initiates a new transaction based on the correlated transaction. As one possibility, visualization module 148 provides a link to purchase one or more of the items corresponding to the correlated transaction on the account statement 104. Recurring household goods orders, monthly bills, insurance coverage are example transactions that can be initiated directly from the printed statement through the augmented reality application 105.

The repurchase link can be overlaid on top of the live statement view on the mobile device display. In that instance, consumer C purchases the same item or service directly through the augmented reality application 105 as a repeat of the previous transaction. In one implementation, selecting the link by the user triggers a command to server 106 to reauthorize the same transaction, such as the amount, type, and/or source of funds. Server 106 places the order to the corresponding retail back-end device. Then the mobile device display provides a message that the transaction is completed. In some instances, this process can also create a queue of transactions to be reviewed and processed at a later time by the user.

There are multiple types of reporting services within a single service provider. For example, visualization module 148 provides a historical analysis of the account shown in account statement 104. The historical analysis can include trends over time, links to previous statements for the same account, or correlating similar transactions across multiple account statements.

In one instance, visualization module 148 provides a list of all transactions that occurred over a particular time period with the same retailer. As another example, transactions are categorized and visualized as a whole across one or several historical periods. As yet another example, all transactions corresponding to a single purchased item are aggregated over the same historical period even if those items were purchased in multi-item transactions. For instance, visualization module 148 provides an itemized and aggregated listing of all purchases of milk from a single retailer and paid for with the same financial provider.

In transaction-based services within multiple service providers mode, multiple financial providers are interfaced to the server 106. When a particular transaction is correlated, the server 106 receives a listing of similar transactions that may have been initiated across the various financial service providers. For instance, a transaction on account statement 104 listing a purchase at a gas station using a particular financial provider is correlated with similar transactions, either from the same gas station location, gas station brand, or gas station category. As the consumer C may have used several forms of payment from different service providers, visualization module 148 aggregates all of the correlated transactions and presents them to the user as a single listing, representative of all similar categorized transactions from a historical perspective.

Figure 3:
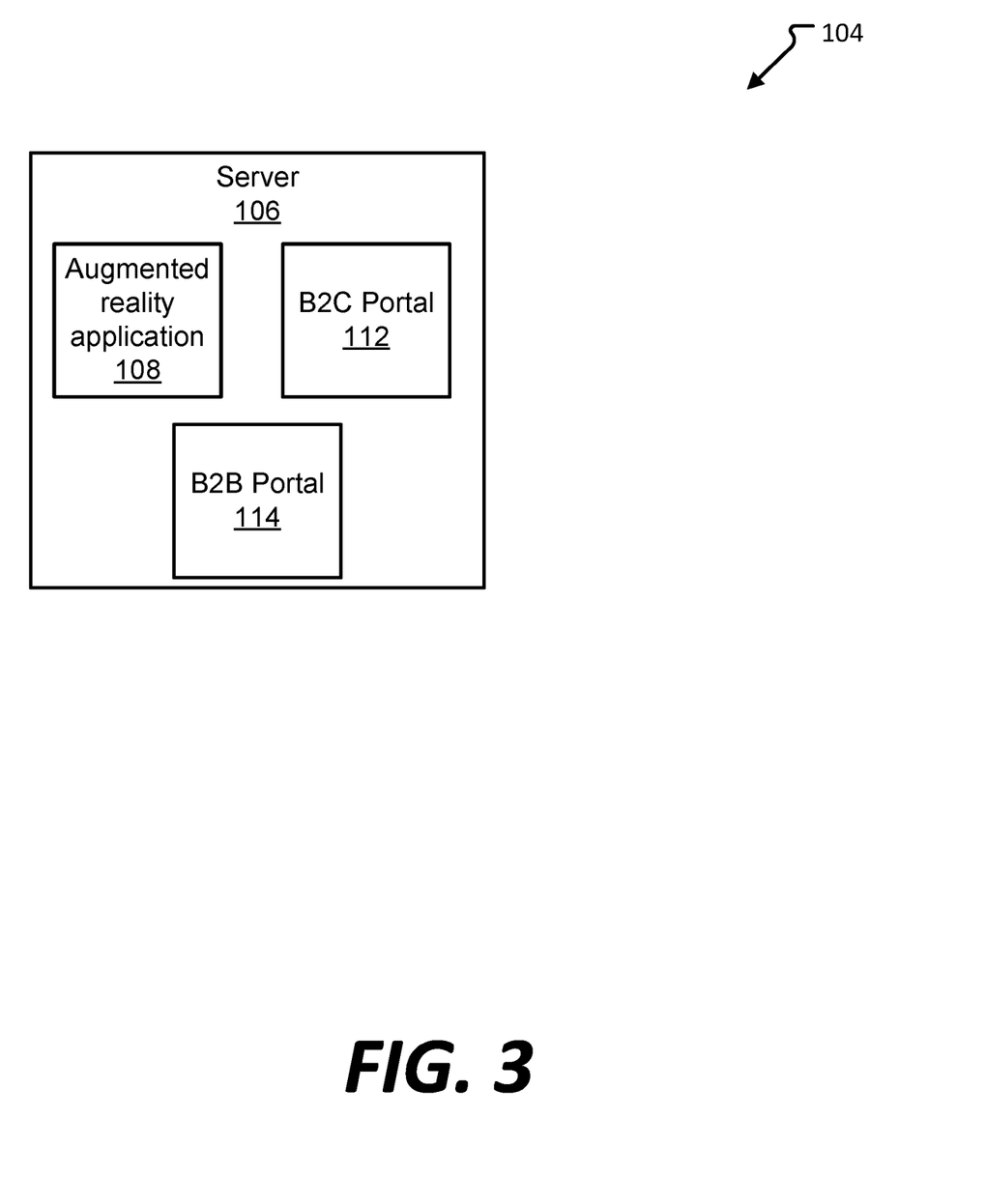
FIG. 3 shows example components of a server in the system of FIG. 1.

FIG. 3 shows logical components of the server 106. In this example, the server 106 includes augmented reality application 108, business-to-consumer (B2C) portal 112, and business-to-business (B2B) portal 114. Server 106 includes components necessary to support augmented reality application 105, such as B2C portal 112, B2B portal 114, data visualization, back-end systems application program interfaces (APIs), content catalog databases. These components can include a set of secured, encrypted APIs to communicate and interface with third party service provider systems to import data into data lakes. Other embodiments can include more or fewer components.

Typically, augmented reality application 105 processes the account statement 104 and includes databases for correlating the statement and transactions. In some instances, server 106 includes augmented reality application 108 to share some of the data storage and processing tasks. In those instances, augmented reality application 108 generates some or all data files and/or visualizations used by augmented reality application 105. Augmented reality application 108 pushes the data files and/or visualizations to the visualization module 148 where they are presented to consumer C via mobile device 102. Additionally, augmented reality application can pre-process the account statements and store the correlations.

Augmented reality application 108 can also include back-end system APIs, which are APIs that augmented reality application 105 calls for interacting with back end systems. This includes users, access rights, marketing, finance, legal, e-commerce, and others.

Augmented reality application 108 can also include data catalogs, such as a DataSet Catalog and Metadata Catalog API. Data catalogs record any changes made to the data and also include data access rules that manage rules, encryption and decryption of data.

Augmented reality application 108 can additionally include data lakes. Data lakes capture analytically useful datasets onto a single infrastructure, and include collections of account statements, service provider data, user data, and third party data. Data lakes also support dynamic analytical applications, such as financial tools and planning.

B2C portal 112 is the gateway (proxy) to back-end APIs as requested by augmented reality application 105 and/or 108. Consumer C logs into the augmented reality B2C web or mobile online portal 112 to select the financial (or other) service providers he/she is using from a list of participating B2B providers.

For example, a list of participating financial providers includes a listing of all major banking institutions, major credit cards, retailers, and lending services, that are providing account statements to the consumer C. Consumer C can select one or more entities from the list that provide statements to the consumer.

When making the selection, consumer C is indicating to the augmented reality application 108 that they will be accessing the selected providers via the augmented reality application 105. This enables the back-end system APIs to interface to the selected financial provider API systems to arrange data communication and notifications. Once a particular service provider is added by consumer C, augmented reality application 108 matches that financial provider to the specific statement template used by that particular provider, facilitating the correlation of the account statement 104.

B2B portal 114 is used by one or more service providers to customize the augmented reality services that are presented to their account holders. B2B portal is also accessible by participating entities, such as retailers, merchants, or other merchandising professionals to add specific content or services that are presented to consumer C.

Customization available to service providers includes a set of content and their properties for each of the services provided by visualization module 148, where those services correspond to the transactions identified in account statement 104. Usually, a service provider has access to the historical data of consumer C who has an account with the service provider. As a result, the service provider can tailor the type of services and notifications presented by augmented reality application 105 based on the profile of the consumer C.

A particular service provider may offer enhanced visualization of its financial statements only based on the financial transaction data in the account statement 104. In contrast, a particular service provider may offer enhanced visualization based on the financial statements data and one or more participating retailers. For example, a particular retailer can offer consumer C additional information about a transaction on account statement 104, such as an itemized listing, a product promotional offer, branded advertising, or other content offerings which may be related to the transaction. As another example, visualization module 148 presents consumer C with the option of initiating the same transaction as a correlated transaction for the same merchant and product or service combination.

Figure 5:
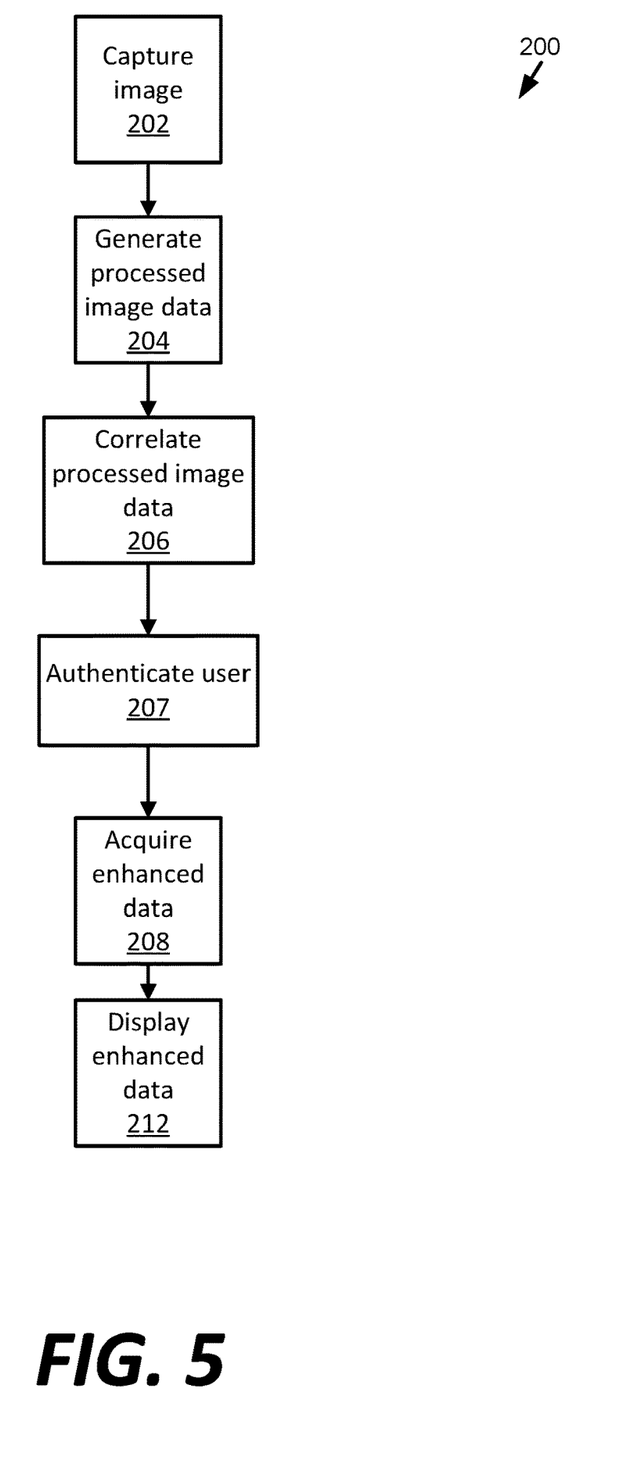
FIG. 5 shows an example method for providing an augmented reality account statement.

FIG. 5 illustrates an example method 200 for augmenting an account statement. The example method 200 includes capturing an image (operation 202), generating processed image data (operation 204), correlating processed image data (operation 206), authenticating a user (operation 207), acquiring enhanced data (operation 208), and displaying enhanced data (operation 212). Typically, augmented reality system 120, shown in FIGS. 1-3, executes the operations of example method 200. Other embodiments can include more or fewer operations.

The example method 200 begins when a mobile device captures an image, or grabs a frame of live video from the mobile device built-in camera, of an account statement (operation 202). Usually, a user of the mobile device is a consumer associated with the account shown in the account statement. The user accesses an augmented reality application, hosted on a mobile device, that is associated with the account's institution. The augmented reality application then, usually without input or action by the user, captures an image or obtains a frame of the account statement using the mobile device's built-in camera.

After capturing an image of the account statement, processed image data are generated (operation 204). Typically, the mobile device processes the account statement. However, in some instances, a server processes the account statement or has already processed the account statement into processed image data. As described above, generating processed image data includes image alignment, aspect ratio normalization, page layout analysis, line and word detection, and character segmentation, as well as obtaining indicia that potentially identifies a service provider's template. Example statement template data include font, transaction spacing, column numbers, and logos, to name a few. The processed image data also includes transaction data, such as a merchant name, date, time, and amount.

Then the processed image data is correlated (operation 206) to identify an institution corresponding to the account statement. Correlating the processed image data includes identifying an institution having a template that matches the template in the captured image. If no template is found in a database of templates, then the parameters of the captured image template can be added to the template and used for future correlations.

After correlating the processed image data, the user is authenticated (operation 207). The user can authenticated via one or more of: user ID and password, fingerprint, voice recognition, face recognition, and/or one-time passcode. In some instances, the user can select an unauthenticated mode with limited account statement enhancements. Usually, the mobile device receives the authentication data, transmits the data to a server for validation, and then receives confirmation back from the server that the user is authenticated.

After the user is authenticated, enhanced data are acquired (operation 208). Typically, mobile device receives the enhanced data from the server, however, in some instances, the augmented reality application on the mobile device also stores some or all of the enhanced data. As mentioned above, the scope of enhanced data is limited if the user is in an unauthenticated mode.

Enhanced data are static or interactive (e.g., hyperlink) data related to the information on the account statement, the institution holding the account, and/or the merchants associated with the transactions on the account statement. Examples are discussed above with reference to FIGS. 1-3 and include information about a transaction on the account statement, offers related to the seller associated with the transaction, a listing of items purchased during a particular transaction, an analysis or historical summary of the account (which can include a listing of previous transactions with the same retailer), an analysis of transactions with an identified retailor made with a plurality of accounts, and/or functionality to repurchase an item or service previously purchased in one of the transactions in the account statement.

When the enhanced data are acquired, the mobile device displays the enhanced data (operation 212). In some embodiments, enhanced data are displayed as an overlay on the captured image. The user can select a particular transaction and enhanced data corresponding to that transaction and/or merchant are then displayed. In other embodiments, enhanced data are displayed without also showing the image of the account statement. In still other embodiments, the display is split between a live view of a portion of the account statement, such as a particular set of transactions, and the additional services corresponding to those transactions.

In some instances, enhanced data are presented to the consumer only while the mobile device camera is directed towards the printed account statement. In other instances, enhanced data are presented only for a period of time after correlating the account statement (or a portion of the account statement); after that period of time, the consumer must re-capture an image of the account statement. This allows dynamic data (e.g., account balances, etc.) to be updated periodically so that the information provided to the consumer is fresh.

As discussed above, some enhanced data are dynamic. Thus, method 200 can also include receiving one or more inputs from the user and taking corresponding action, such as querying a particular web service.

Figure 6:
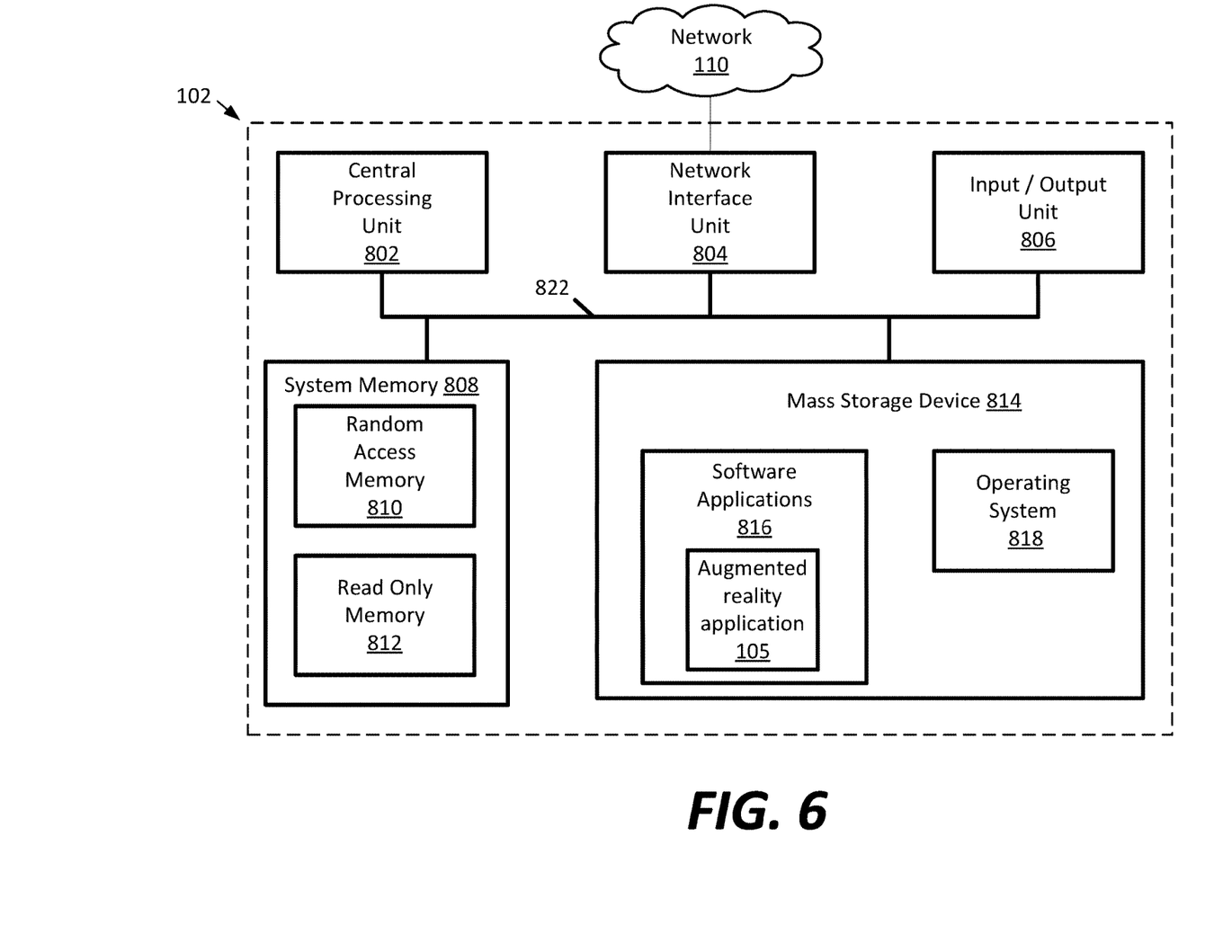
FIG. 6 shows example physical components of a computing device hosting the modules of the system of FIGS. 1-3.

FIG. 6 shows one example of the mobile device 102 hosting software applications 816, including augmented reality application 105. Other computing devices discussed herein, such as server 106, can be configured in a similar manner.

As illustrated, the mobile device 102 includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the mobile device 102, such as during startup, is stored in the ROM 812. The mobile device 102 further includes a mass storage device 814. The mass storage device 814 is able to store software instructions and data.

The mass storage device 814 is connected to the CPU 802 through a mass storage controller (not shown) connected to the system bus 822. The mass storage device 814 and its associated computer-readable data storage media provide non-volatile, non-transitory storage for the mobile device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the mobile device 102.

According to various embodiments contemplated by the disclosure, the mobile device 102 may operate in a networked environment using logical connections to remote network devices through the network 110, such as a wireless network, the Internet, or another type of network. The mobile device 102 may connect to the network 110 through a network interface unit 804 connected to the system bus 822. It should be appreciated that the network interface unit 804 may also be utilized to connect to other types of networks and remote computing systems. The mobile device 102 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the mobile device 102 can store software instructions and data. The software instructions include an operating system 818 suitable for controlling the operation of the mobile device 102. The mass storage device 814 and/or the RAM 810 also store software instructions, that when executed by the CPU 802, cause the mobile device 102 to provide the functionality of the mobile device 102 discussed in this document. For example, the mass storage device 814 and/or the RAM 810 can store software instructions that, when executed by the CPU 802, cause the mobile device 102 to present an augmented reality account statement.

Although various embodiments are described herein, those of ordinary skill in the art will understand that many modifications may be made thereto within the scope of the present disclosure. Accordingly, it is not intended that the scope of the disclosure in any way be limited by the examples provided.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method for augmenting an account statement associated with an account, the method comprising:
   identifying the account statement with an augmented reality device;
   acquiring enhanced data from the account using the augmented reality device for a transaction listed on the account statement that is within the view of the augmented reality device, the enhanced data being related to the transaction from the account statement;
   displaying the account statement and enhanced data for the transaction that is within the view of the augmented reality device on a display of the augmented reality device, the enhanced data including:

an itemized listing of one or more products or services included within the transaction, wherein receiving selection of individual products or services within the itemized listing flags the individual products or services for further review; and
a repurchase link being overlaid in augmented reality upon the transaction on the account statement;
receiving selection of the repurchase link on the augmented reality device;
thereupon, initiating a command to repurchase the one or more products or services associated with the transaction; and
upon determining that the transaction is no longer within the view of the augmented reality device, removing the display of the enhanced data from the display of the augmented reality device.

2. The method of claim 1, further comprising capturing an image of the account statement with a camera of the augmented reality device.

3. The method of claim 2, further comprising:
processing the image to generate processed image data; and
correlating the processed image data to identify an institution corresponding to the account statement.

4. The method according to claim 3, wherein the processed image data includes statement template data.

5. The method according to claim 4, wherein correlating the processed image data includes comparing the statement template data to a set of pre-existing statement templates; and
if no pre-existing statement template is found, adding the statement template data to the set of pre-existing statement templates.

6. The method according to claim 4, wherein the processed image data include transaction data, and further comprising:
acquiring stored transaction data for the account; and
correlating the transaction data with the stored transaction data.

7. The method according to claim 2, wherein the image is a frame of live video acquired by the augmented reality device.

8. An augmented reality system, comprising:
a processing unit; and
system memory, the system memory including instructions that, when executed by the processing unit, cause the augmented reality system to:
identify an account statement;
acquire enhanced data from an account for a transaction listed on the account statement, the enhanced data being related to the transaction from the account statement;
display the account statement and enhanced data on a display of the augmented reality system, the enhanced data including an itemized listing of one or more products or services included within the transaction and a repurchase link being overlaid in augmented reality upon the transaction on the account statement, wherein receiving selection of individual products or services within the itemized listing flags the individual products or services for further review;
receive selection of the repurchase link on the augmented reality system;
thereupon, initiate a command to repurchase the one or more products or services associated with the transaction; and
upon determining that the transaction is no longer within the view of the augmented reality system, remove the display of the enhanced data from the display of the augmented reality system.

9. The augmented reality system of claim 8, further comprising instructions that, when executed by the processing unit, cause the augmented reality system to capture an image of the account statement with a camera of the augmented reality system.

10. The augmented reality system of claim 9, further comprising instructions that, when executed by the processing unit, cause the augmented reality system to:
process the image to generate processed image data; and
correlate the processed image data to identify an institution corresponding to the account statement.

11. The augmented reality system according to claim 10, wherein the processed image data includes statement template data.

12. The augmented reality system according to claim 11, further comprising instructions that, when executed by the processing unit, cause the augmented reality system to:
compare the statement template data to a set of pre-existing statement templates; and
if no pre-existing statement template is found, add the statement template data to the set of pre-existing statement templates.

13. The augmented reality system according to claim 9, wherein the image is a frame of live video acquired by the augmented reality system.

14. An augmented reality system, comprising:
a processing unit; and
system memory, the system memory including instructions that, when executed by the processing unit, cause the augmented reality system to:
receive an account statement, the account statement including a plurality of transactions;
acquire enhanced data from an account for a transaction of the plurality of transactions, the enhanced data being related to the transaction from the account statement;
display the account statement and enhanced data on a display of the augmented reality system, the enhanced data including an itemized listing of one or more products or services included within the transaction and a repurchase link being overlaid in augmented reality upon the transaction of the plurality of transactions on the account statement, wherein receipt of selection of individual products or services within the itemized listing flags the individual products or services for further review;
receive selection of the repurchase link on the augmented reality system;
thereupon, initiate a command to repurchase the one or more products or services associated with the transaction; and
upon determining that the transaction is no longer within the view of the augmented reality system, remove the display of the enhanced data from the display of the augmented reality system.

15. The augmented reality system of claim 14, further comprising instructions that, when executed by the processing unit, cause the augmented reality system to capture an image of the account statement with a camera of the augmented reality system.

16. The augmented reality system of claim 15, further comprising instructions that, when executed by the processing unit, cause the augmented reality system to:

process the image to generate processed image data; and correlate the processed image data to identify an institution corresponding to the account statement.

17. The augmented reality system according to claim 16, wherein the processed image data includes statement template data.

18. The augmented reality system according to claim 17, further comprising instructions that, when executed by the processing unit, cause the augmented reality system to:

compare the statement template data to a set of pre-existing statement templates; and if no pre-existing statement template is found, add the statement template data to the set of pre-existing statement templates.

19. The augmented reality system according to claim 15, wherein the image is a frame of live video acquired by the augmented reality system.

20. The augmented reality system according to claim 14, further comprising instructions that, when executed by the processing unit, cause the augmented reality system to acquire stored transaction data.

\* \* \* \* \*